MAGNETOSTRICTIVE DELAY LINE PULSE SEQUENCE GENERATOR
Filed Dec. 26, 1967 2 Sheets-Sheet 1
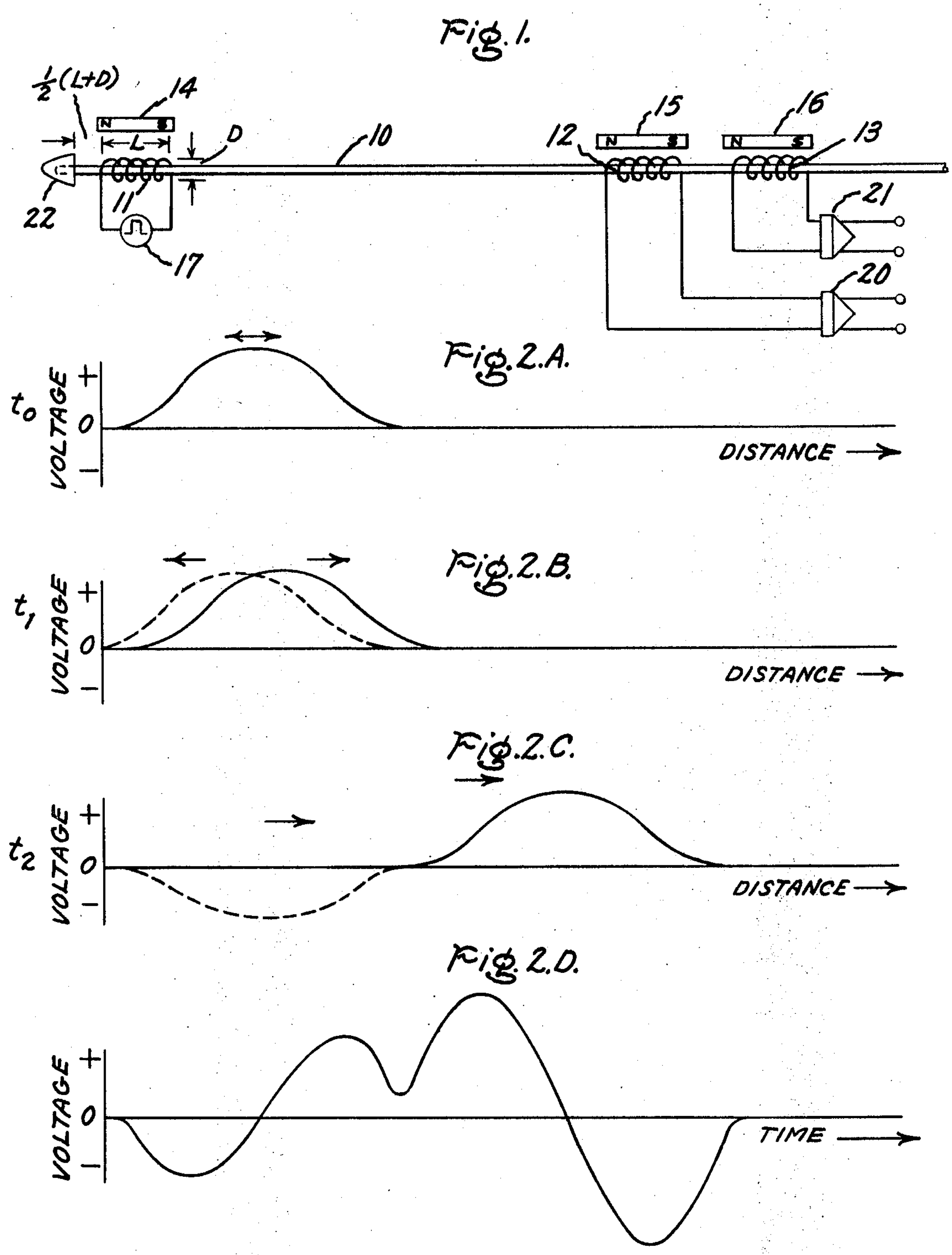
Fig. 1. Fig. 2.A. Fig. 2.B. Fig. 2.C. Fig. 2.D.
Inventor:
Jerome J. Tiemann,
by Marvin Snyder
His Attorney.

MAGNETOSTRICTIVE DELAY LINE PULSE SEQUENCE GENERATOR

Filed Dec. 26, 1967 2 Sheets-Sheet 2

Inventor:
Jerome J. Tiemann,
by Marvin Snyder
His Attorney.

3,517,320
MAGNETOSTRICTIVE DELAY LINE PULSE SEQUENCE GENERATOR

Jerome J. Tiemann, Schenectady, N.Y., assignor to General Electric Company, a corporation of New York Filed Dec. 26, 1967, Ser. No. 693,497
Int. Cl. H03k 5/159
U.S. Cl. 328—56 14 Claims

ABSTRACT OF THE DISCLOSURE

An arbitrary sequence of sharp electrical output pulses is produced by inducing a single sonic pulse in a wire of magnetostrictive material. The voltages picked up by coils spaced along the wire are integrated electronically to produce the output pulses. The wire is extended beyond the launch coil a distance substantially equal to one-half the sum of the launch coil length plus diameter, so that the leading edge of each reflected sonic pulse follows immediately upon the trailing edge of the original pulse. The reflected pulse is adjusted in amplitude to cancel the tail on each output pulse resulting from the original pulse.

Background of the invention

This inventon relates to pulse generators, and more particularly to a method and apparatus for producing a sequence of sharp electrical output pulses, each pulse being delayed by a predetermined time.

In employment of electrical apparatus, need often exists for generation of precisely timed output pulses, either alone or in sequence, by passive means. One application for such pulses is described in R. L. Watters Pat. No. 3,270,338, issued Aug. 30, 1966, and assigned to the instant assignee. For applications where external power sources are not convenient for example, such pulses should be produced from passive apparatus by a single initiation pulse. The present invention concerns generation of pulses in this manner, employing propagation of sonic pulses in a magnetostrictive wire to overcome the limitations which would otherwise be imposed by use of saturable cores, including the considerable expense of winding the cores. Moreover, in the instant invention, only one coil and no capacitors are utilized to produce each output pulse. In addition, pulse timing is much more constant than when other methods are employed, depending only very slightly on temperature and being completely independent of driving voltage amplitude.

Brief summary of the invention

Accordingly, one subject of the invention is to provide a method and apparatus for generating a sequence of output pulses from a single trigger pulse.

Another object is to provide simplified passive apparatus for sonically generating sharp electrical output pulses in response to a single trigger pulse.

Another object is to provide a method and apparatus for conveniently selecting a time delay for each of a plurality of pulses to a high degree of precision.

Briefly, in accordance with a preferred embodiment of the invention, apparatus for producing sharp electrical output pulses by sonic means is provided. The apparatus comprises a magnetostrictive delay line, a launch coil, and at least one pickup coil disposed along the length of the delay line. The launch coil is positioned at a distance from one end of the line substantially equal to one-half the sum of the length and diameter of the launch coil. This one end of the line, herein designated the reflecting end, is terminated in an acoustically absorbent material. Since the magnetostriction effect of some materials increases with applied magnetic field, the launch coil may be used in combination with a biasing magnet placed in its vicinity to improve electro-mechanical coupling between current in the coil and strain in the wire. Integrating means are coupled to each pickup coil for converting output signals from the delay line to sharp, essentially unipolar electrical pulses.

Brief description of the drawings

The features of the invention believed to be novel are set forth with particularity in the appended claims. The invention iself, however, both as to organization and method of operation, together with further objects and advantages thereof, may best be understood by reference to the following description taken in conjunction with the accompanying drawings in which:

FIG. 1 is a schematic diagram of a system utilizing the instant invention.

FIGS. 2A–2C are time sequence diagrams used in illustrating progression of strain pulses through the delay line of FIG. 1;

FIG. 2D is a diagram illustrating voltage induced in a pickup coil in the apparatus of FIG. 1 resulting from the strain pulse of FIG. 2C;

Description of typical embodiments

Figure 3:
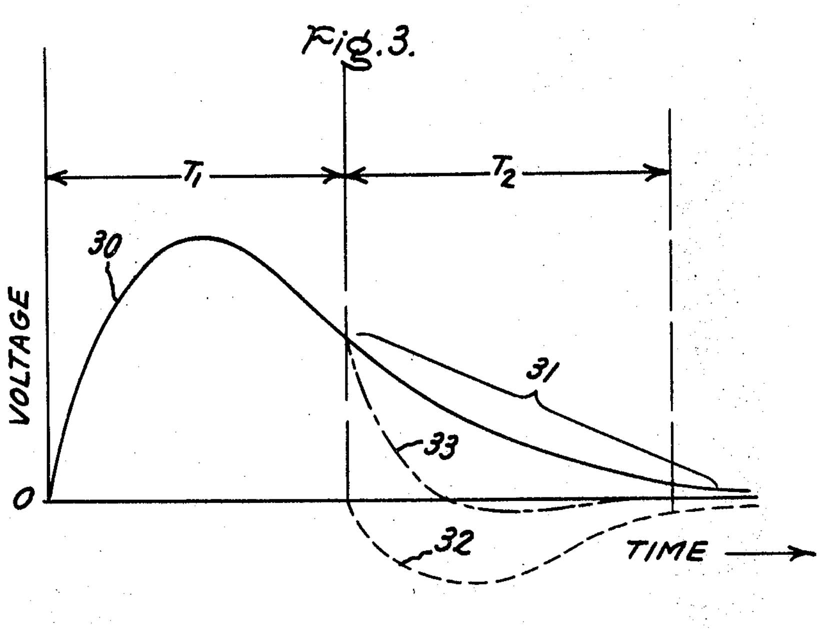
FIG. 3 is a diagram of output voltage produced by an integrating amplifier connected to a pickup coil in the apparatus of FIG. 1.

In FIG. 1, a magnetostrictive delay line comprising a magnetostrictive wire 10 is illustrated with a launch coil 11 wound about wire 10 and situated close to one end thereof. The delay line is preferably comprised of nickel, although other materials are also useful as magnetostrictive delay lines. For example, delay line 10 could, in the alternative, comprise approximately 3 percent of silicon in iron, Permalloy, deltamax, or other materials known to exhibit magnetostrictive qualities. A pair of pickup coils 12 and 13 are wound about delay line 10 and disposed along the length thereof, with a bias field being provided for each of coils 11, 12 and 13 by permanent magnets 14, 15 and 16, respectively. Each of magnets 14, 15 and 16 is preferably comprised of alnico and is situated in the vicinity of its respectively associated coil. Coil 11, which has a length L and diameter D, is driven by a rectangular voltage wave generator 17, while each of pickup coils 12 and 13 drives an integrating amplifier 20 and 21 respectively.

The end of wire 10 beyond launch coil 11 is terminated in an element 22 for absorbing acoustic energy. For example, a small ball of solder on the end of the wire, surrounded by a selected amount of a dissipative substance such as plasticene clay, is used to determine the reflection constant for the wire at that end. Although the preferred embodiment employs a dissipative termination for acoustic energy at the distant end (not shown) of the delay line wire, the type of termination at the distant end of the wire is unimportant, since any reflections from the end of the wire nearest the pickup coils appear at a later time than any intended output pulse. These spurious reflections can be gated out of any utilization apparatus by conventional means, and thus can be neglected. On the other hand, the reflected pulse from the end of the wire nearest the launch coil is utilized to improve the output waveform of each of integrating amplifiers 20 and 21. This improvement is achieved by positioning launch coil 11 at a distance from the end of the wire equal to approximately one-half the sum of the length plus the diameter of the launch coil, indicated in FIG. 1 as $\frac{1}{2}(L+D)$, so as to cause the leading edge of the reflected pulse from the end of the wire near the launch coil to follow immediately upon completion of the trailing edge of the original pulse.

The pulse reflected from the end of the wire nearest the launch coil is inverted in polarity with respect to the original pulse if the end of the wire nearest the launch coil is free. On the other hand, if the end of the wire nearest the launch coil is terminated rigidly, the reflected pulse appears with the same polarity as the original pulse. By varying the acoustic impedance of termination element 22, as by changing its density for example, it is possible to obtain any reflection desired with a coefficient between +1 and −1.

With a rectangular pulse of current applied across launch coil 11, the change in magnetic field of coil 11 induces a strain pulse, as illustrated in FIG. 2A, which travels through the length of wire 10. In the event that the magnetic field change causes a physical expansion of the material of wire 10, the travelling strain pulse will be a compressive strain; if the change in magnetic field produces a contraction, the pulse will be a tension pulse. These strain pulses cause a change in the magnetic permeability of the wire and, in the presence of bias magnets 15 and 16, this change in permeability is accompanied by a change in magnetic flux. This change in flux causes an output voltage to appear across each pickup coil. As the strain pulse moves through the region of the pickup coils, two responses of opposite polarity occur in each of the pickup coils as shown in FIG. 2D. If the induced voltage pulses are integrated, as by integrating amplifiers 20 and 21, the integrated pulses appear as single polarity pulses. However, due tot he finite time constant of the electronic integrators, the integrated output pulses normally are not sharp; usually, each pulse has a long tail which dies away with the time constant of the integrator. This tail makes the integrated output pulses less useful in many applications. By properly positioning coil 11, as previously described, and by properly choosing the attenuating material comprising terminal element 22 to produce the desired amplitude of reflection coefficient from the end of the wire nearest the launch coil, the reflected pulse is made to essentially cancel out the spurious tail on the integrated output pulse. This allows each integrated output pulse to have characteristics that are independent of previous integrated output pulses.

FIG. 2A illustrates a strain pulse induced in magneto strictive wire 10 by launch coil 11, with positive amplitudes representing extensional strain and negative amplitudes representing compressional strain. The waveform is represented by plotting amplitude against distance, and FIG. 2A represents the strain state of the wire at time $T_0$, at which time the strain pulse is first induced in the wire. The double arrow indicates that this pulse will travel through wire 10 in both directions outward from launch coil 11.

FIG. 2B illustrates the unsummed strains in wire 10 at at ime $T_1$, subsequent to time $T_0$. At this time, the original strain pulse, represented by the solid line, has moved down the wire toward pickup coils 12 and 13, while a second original strain pulse, indicated by the dotted line which is identical to the solid line pulse in shape and amplitude, has travelled from wire 10 towards termination 22. As illustrated, the leading edge of this second pulse is distorted somewhat from its original shape due to existence of termination 22, represented graphically by the origin of the abscissa.

FIG. 2C illustrates the conditions in wire 10 at time $T_2$, subsequent to time $T_1$, which occurs when the second original strain wave has completely reversed itself in phase and decreased in amplitude by a predetermined amount according to the amplitude of the reflection coefficient supplied by termination 22. Thus, the dotted wave in FIG. 2C now represents a reflected wave, while the solid line waveform still represents the original wave, which remains substantially undiminished. As indicated by the arrows in FIG. 2C, both waveforms now travel through the wire toward pickup coils 12 and 13, with the leading edge of the reflected pulse following immediately on the trailing edge of the original pulse. FIG. 2D represents the voltage induced in either of pickup coils 12 and 13 due to the strain pulses illustrated in FIG. 2C.

FIG. 3 represents the output voltage produced by either of amplifiers 20 or 21 as, for example, amplifier 20, plotted against time. The output voltage illustrated by the solid line 30 corresponds to that which results if just the solid line waveform of FIGS. 2B and 2C reaches pickup coil 12. This curve has a negative tail portion 31 which assumes a substantially exponential shape. This tail portion is undesirable because it interferes with subsequent pulses which may be present. However, by immediately following the original pulse along the delay line with the reflected pulse in the manner illustrated in FIG. 2C, and with the reflected pulse being attenuated below the amplitude of the original pulse, an output waveform 32, indicated by the dotted line, is initiated after a time $T_1$ required for completion of the original pulse. Waveform 32, which would be reproduced only in the presence of the reflected pulse alone, adds to the negative tail 31, resulting in a net output voltage which follows the dot-dashed line 33. In this manner, the output voltage produced by amplifier 20 is prevented from tailing off, but instead is brought to zero very quickly upon completion of the output voltage waveform induced in coil 12 by the original strain pulse in the delay line. After another interval $T_2$, which is of equal duration of interval $T_1$, the output voltage induced in coil 12 by the reflected strain pulse in the delay line is completed, and the tailing off of the integrated voltages resulting from both the original and the reflected strain pulses cancel each other out. Thus, upon completion of interval $T_1$ plus a fraction of interval $T_2$ after the original strain pulse first initiated the output voltage pulse from integrating amplifier 20, the net output voltage produced by the amplifier is zero. It should be noted that for this cancellation process to operate, it is essential that the reflected strain wave be of opposite polarity to that of the original strain pulse, as illustrated in FIG. 2C.

Upon completion of the output pulse from amplifier 20, or even prior thereto, depending upon the separation between pickup coils 12 and 13, the original pulse together with the reflected pulse following immediately thereon, reach pickup coil 13. Consequently, amplifier 21 produces an output voltage corresponding to the solid line curve 30 and the dot-dashed line curve 33 of the waveform of FIG. 3, without negative tail 31. Additional pickup coils and amplifiers may also be connected in the system; that is, any convenient number of output coils may be connected along the delay line to produce output voltage pulse trains of a corresponding number of pulses respectively. This is possible because very little attenuation of the output voltage pulses results even when a plurality of pickup coils are utilized.

Figure 4:
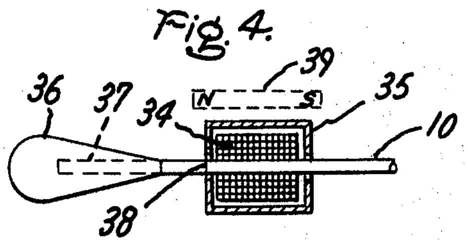
FIG. 4 is a sectional view of another embodiment of the transmitting portion of the apparatus of FIG. 1.

FIG. 4 illustrates a second embodiment of launch coil apparatus for producing sharp electrical output pulses by inducing strain pulses in magnetostrictive wire 10. In this embodiment, a launch coil 34 is enclosed in a magnetic shield 35, which is comprised of low coercivity material such as Permalloy, and wire 10 is terminated essentially in alignment with the end of the shield. A wire 37 of different acoustical impedance from that of wire 10 is attached to the end of wire 10. Wire 37, which may typically be comprised of glass fused to wire 10, is terminated in an acoustical absorber 36, such as plasticene clay, in order to obtain the desied reflection coefficient. An optional biasing magnet 39 may be situated in the vicinity of the launch coil if desired, and hence is shown dotted.

Magnetic shield 35 confines the launch coil field essentially to the portion of wire 10 within the enclosed region of the shield, resulting in strain pulses of leading and trailing edge slopes more vertical than those shown in FIGS. 2A–2C. Thus the reflecting surface for strain waves propagating through magnetostrictive wire 10, comprising the glass to magnetostrictive wire interface 38, is positioned essentially in alignment with one end of shield 35. The reflected wave then propagate through the wire with its leading edge following immediately on the trailing edge of the original pulse in a manner similar to that illustrated in FIGS. 2A–2C. The voltage induced in each pickup coil, moreover, corresponds essentially to the waveforms illustrated in FIG. 2D, so that the spurious tail on each integrated pulse can be cancelled out as illustrated in FIG. 3.

Figure 5:
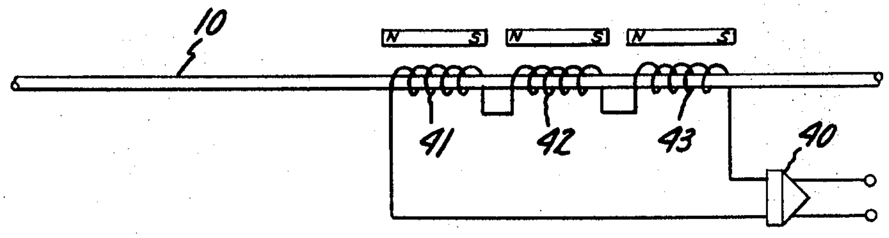
FIG. 5 is a schematic diagram of pickup apparatus alternate to that of FIG. 1.

FIG. 5 illustrates an alternative embodiment of pickup apparatus to that shown in FIG. 1 which permits a saving in output amplifiers by connecting a plurality of pickup coils 41, 42 and 43 in series across the input terminals of an integrating amplifier 40. In this embodiment, a limitation on the number of output pulses is imposed by the input impedance of amplifier 40; that is, the input impedance of amplifier 40 must exceed the sum of the impedances of all of pick coils 41–43. Nevertheless the input impedance of an amplifier can be made very large, so that this requirement presents no appreciable problem. This configuration is known variously as a sequence generator, a pulse encoder, or a word generator.

A particular advantage in using nickel for the magnetostrictive material of wire 10 in the embodiments of FIGS. 1, 4 and 5 resides in the fact that this material has a sufficiently high coercive force; therefore, once the wire has been magnetized, it remains magnetized even after the biasing magnet in the vicinity of the magnetized region is removed. Since the polarity of the output voltage pulse produced by a pickup coil depends on the direction of a change in amplitude of the magnetic field in wire 10, any particular sequence of output voltage polarities may be established without disconnecting any wires. This sequence thereafter remains until it is deliberately changed by applying a strong magnetic field to the wire.

The foregoing describes a method and apparatus for generating a sequence of sharp electrical output pulses from a single trigger pulse. The invention provides simplified passive apparatus for sonically generating the output pulses in response to a single trigger pulse. The output pulses may be adjustably delayed by selectively positioning the location of pickup coils along a magnetostrictive delay line.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. Apparatus for producing sharp electrical output pulses comprising: a magnetostrictive delay line; a launch coil, said launch coil being positioned at a distance from one end of said delay line substantially equal to one-half the sum of the length and diameter of said launch coil; acoustically absorbent material terminating said one end of said delay line; at least one pickup coil disposed along the length of said delay line; and integrating means coupled to each said pickup coil for converting output signals from said delay line to sharp, essentially unipolar electrical pulses.

2. The apparatus of claim 1 wherein said delay line comprises nickel.

3. The apparatus of claim 1 wherein said launch coil and each said pickup coil are wound about said delay line.

4. Apparatus for producing sharp electrical output pulses comprising: a magnetostrictive wire; a launch coil wound about said wire, said launch coil being positioned at a distance from one end of said wire substantially equal to one-half the sum of the length and diameter of said launch coil; acoustically absorbent material terminating said one end of said wire; a plurality of pickup coils disposed along the length of said wire, each of said pickup coils being wound about said wire; and integrating amplifier means coupled to said plurality of pickup coils for converting output signals from said wire to sharp, essentially unipolar electrical pulses.

5. The apparatus of claim 4 wherein said pickup coils are connected in series across the input of said integrating amplifier means.

6. The apparatus of claim 4 wherein said integrating amplifier means comprises a plurality of integrating amplifiers, each one of said pickup coils being connected across the input of one of said integrating amplifiers respectively.

7. The apparatus of claim 4 including a plurality of biasing magnets, said biasing magnets being situated in the vicinity of each of said pickup coils respectively.

8. The apparatus of claim 7 including an additional biasing magnet situated in the vicinity of said launch coil.

9. Apparatus for producing sharp electrical output pulses comprising: a magnetostrictive wire; a magnetic shield; a launch coil wound about said wire and enclosed in said magnetic shield, one end of said shield being positioned essentially in alignment with one end of said wire; a second wire attached to the end of said magnetostrictive wire, said second wire being of different acoustical impedance from that of said magnetostrictive wire; acoustically absorbent material terminating the opposite end of said second wire; a plurality of pick-up coils disposed along the length of said wire; each of said pickup coils being wound about said wire; and integrating amplifier means coupled to said plurality of pickup coils for converting output signals from said wire to sharp, essentially unipolar electrical pulses.

10. The apparatus of claim 9 wherein said second wire comprises glass.

11. The apparatus of claim 9 wherein said pickup coils are connected in series across the input of said integrating amplifier means.

12. The apparatus of claim 9 wherein said integrating amplifier means comprises a plurality of integrating amplifiers, each one of said pickup coils being connected across the input of one of said integrating amplifiers respectively.

13. The apparatus of claim 9 including a plurality of biasing magnets, said biasing magnets being situated in the vicinity of each of said pickup coils respectively.

14. The apparatus of claim 13 including an additional biasing magnet situated in the vicinity of said launch coil.

References Cited

UNITED STATES PATENTS

| | | | |
|---|---|---|---|
| 2,565,469 | 8/1951 | Bradburd | 333—30 |
| 2,612,603 | 9/1952 | Nicholson | 333—30 |
| 2,946,968 | 7/1960 | Faulkner | 333—30 |
| 3,080,537 | 3/1963 | Tenten | 328—56 X |
| 3,173,131 | 3/1965 | Perucca | 333—30 |

DONALD D. FORRER, Primary Examiner

J. D. FREW, Assistant Examiner

U.S. Cl. X.R.

307—268, 293; 328—55; 330—30